United States Patent
Trachewsky

(10) Patent No.: US 8,363,696 B2
(45) Date of Patent: *Jan. 29, 2013

(54) LOW-RATE LONG-RANGE MODE FOR OFDM WIRELESS LAN

(75) Inventor: Jason Alexander Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,068

(22) Filed: Sep. 6, 2011

(65) Prior Publication Data

US 2012/0063489 A1  Mar. 15, 2012

Related U.S. Application Data

(63) Continuation of application No. 12/796,315, filed on Jun. 8, 2010, now Pat. No. 8,014,437, which is a continuation of application No. 11/265,134, filed on Nov. 3, 2005, now Pat. No. 7,733,939.

(60) Provisional application No. 60/624,196, filed on Nov. 3, 2004.

(51) Int. Cl.
*H04B 1/00* (2006.01)

(52) U.S. Cl. ........ 375/141; 375/137; 375/140; 375/219; 375/260; 375/267; 375/295; 375/299; 375/340; 375/342

(58) Field of Classification Search .................. 375/131, 375/137, 140, 260, 267, 295, 299, 219, 340, 375/342

See application file for complete search history.

(56) References Cited

U.S. PATENT DOCUMENTS

| | | | |
|---|---|---|---|
| 5,841,808 A | 11/1998 | Rizzo et al. |
| 6,188,717 B1 | 2/2001 | Kaiser et al. |
| 6,347,112 B1 | 2/2002 | Lattard et al. |
| 6,912,241 B2 | 6/2005 | Giannakis et al. |
| 7,092,431 B2 | 8/2006 | Maeda et al. |
| 7,161,895 B1 | 1/2007 | Sudo |
| 7,218,691 B1 | 5/2007 | Narasimhan |
| 7,236,452 B2 | 6/2007 | Maeda et al. |

(Continued)

FOREIGN PATENT DOCUMENTS

| | | |
|---|---|---|
| CN | 1296671 | 5/2001 |
| CN | 1375969 | 10/2002 |

(Continued)

OTHER PUBLICATIONS

Nara et al. "Overview of Multicarrier COMA," IEEE Communications Magazine, Dec. 1997.

(Continued)

*Primary Examiner* — Sam K Ahn
*Assistant Examiner* — Sophia Vlahos
(74) *Attorney, Agent, or Firm* — Garlick & Markison; Edward J. Marshall

(57) ABSTRACT

A system for implementing an orthogonal frequency division multiplexing scheme and providing an improved range extension. The system includes a transmitter for transmitting data to a receiver. The transmitter includes a symbol mapper for generating a symbol for each of a plurality of subcarriers and a spreading module for spreading out the symbol on each of the plurality of subcarriers by using a direct sequence spread spectrum. The symbol on each of the plurality of subcarriers is spread by multiplying the symbol by predefined length sequences. The receiver includes a de-spreader module for de-spreading the symbols on each of the plurality of subcarriers. The de-spreader module includes a simply correlator receiver for obtaining maximum detection. The correlator produces an output sequence of a same length as an input sequence and the de-spreader module uses a point of maximum correlation on the output sequence to obtain a recovered symbol.

22 Claims, 5 Drawing Sheets

U.S. PATENT DOCUMENTS

| | | |
|---|---|---|
| 7,366,250 B2 * | 4/2008 | Mujtaba et al. ............... 375/267 |
| 7,400,686 B2 | 7/2008 | Borran et al. |
| 7,418,043 B2 | 8/2008 | Shattil |
| 7,443,827 B2 | 10/2008 | Sano |
| 7,529,289 B2 | 5/2009 | Currivan et al. |
| 7,548,579 B1 * | 6/2009 | Murphy et al. ............... 375/147 |
| 7,733,939 B2 * | 6/2010 | Trachewsky ................. 375/141 |
| 8,014,437 B2 | 9/2011 | Trachewsky |
| 2001/0021182 A1 | 9/2001 | Wakutsu |
| 2002/0159425 A1 | 10/2002 | Uesugi et al. |
| 2003/0137957 A1 | 7/2003 | Kakura et al. |
| 2004/0047400 A1 | 3/2004 | Iinatti et al. |
| 2004/0170157 A1 | 9/2004 | Kim et al. |
| 2004/0196780 A1 | 10/2004 | Chin et al. |
| 2005/0249109 A1 * | 11/2005 | Cleveland .................... 370/203 |
| 2006/0104335 A1 | 5/2006 | Trachewsky |
| 2010/0303131 A1 | 12/2010 | Trachewsky |

FOREIGN PATENT DOCUMENTS

| | | |
|---|---|---|
| EP | 1130840 | 9/2001 |

OTHER PUBLICATIONS

Van Wyk et al. "A discrete pseudo Winger distribution spread spectrum detection procedure employing complex spreading sequences," IEEE Oct. 1994.

European Patent Office; European Search Report; EP Application No. 05023868.2; Oct. 24, 2012; 7 pgs.

* cited by examiner

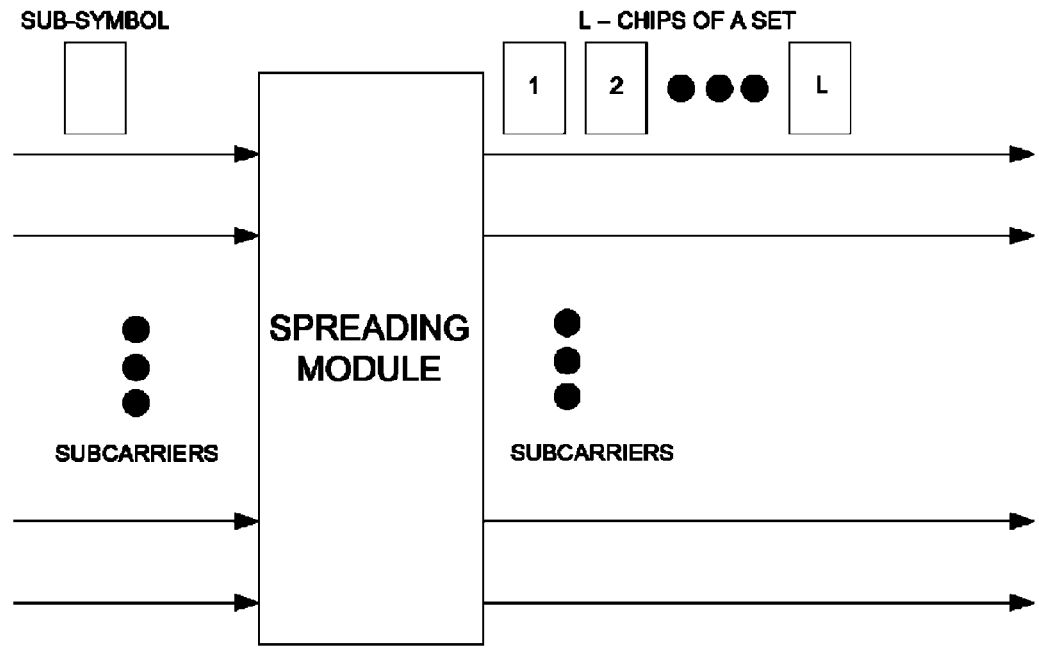
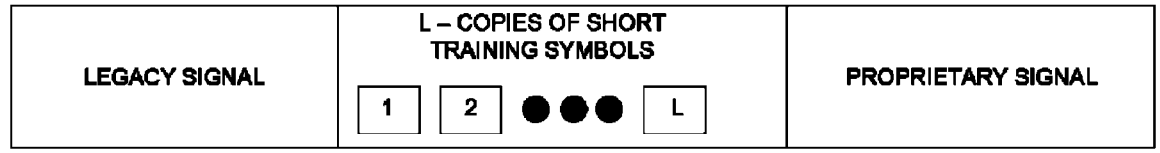
FIGURE 5

LOW-RATE LONG-RANGE MODE FOR OFDM WIRELESS LAN

CROSS-REFERENCE TO RELATED APPLICATIONS/INCORPORATION BY REFERENCE

The present application is a CONTINUATION of U.S. application Ser. No. 12/796,315, filed Jun. 8, 2010, now issued U.S. Pat. No. 8,014,437, which is a CONTINUATION of U.S. application Ser. No. 11/265,134, filed Nov. 3, 2005, now issued U.S. Pat. No. 7,733,939. Said U.S. application Ser. No. 11/265,134 makes reference to, claims priority to and claims benefit from U.S. Provisional Application No. 60/624,196, filed Nov. 3, 2004. The above-identified applications are hereby incorporated herein by reference in their entirety.

BACKGROUND OF THE INVENTION

1. Field of the Invention

The present invention relates generally to wireless communication systems and more particularly to an improvement in the range of a wireless LAN device.

2. Description of the Related Art

A wireless communication device in a communication system communicates directly or indirectly with other wireless communication devices. For direct/point-to-point communications, the participating wireless communication devices tune their receivers and transmitters to the same channel(s) and communicate over those channels. For indirect wireless communications, each wireless communication device communicates directly with an associated base station and/or access point via an assigned channel. To complete a communication connection between the wireless communication devices, the associated base stations and/or access points communicate with each other directly, via a system controller, the public switch telephone network, the Internet, and/or some other wide area network.

Each wireless communication device participating in wireless communications includes a built-in radio transceiver (i.e., receiver and transmitter) or is coupled to an associated radio transceiver. Typically, the transmitter includes one antenna for transmitting radiofrequency (RF) signals, which are received by one or more antennas of the receiver. When the receiver includes two or more antennas, the receiver selects one of antennas to receive the incoming RF signals. This type of wireless communication between the transmitter and receiver is known as a single-output-single-input (SISO) communication.

Different wireless devices in a wireless communication system may be compliant with different standards or different variations of the same standard. For example, 802.11a, an extension of the 802.11 standard, provides up to 54 Mbps in the 5 GHz band and uses an orthogonal frequency division multiplexing (OFDM) encoding scheme. 802.11b, another extension of the 802.11 standard, provides 11 Mbps transmission (with a fallback to 5.5, 2 and 1 Mbps) in the 2.4 GHz band. 802.11g, another extension of the 802.11 standard, provides 20+Mbps in the 2.4 GHz band and also uses the OFDM encoding scheme. 802.11n, a new extension of 802.11, is being developed to address, among other things, higher throughput and compatibility issues. An 802.11a compliant communications device may reside in the same WLAN as a device that is compliant with another 802.11 standard. When devices that are compliant with multiple versions of the 802.11 standard are in the same WLAN, the devices that are compliant with older versions are considered to be legacy devices. To ensure backward compatibility with legacy devices, specific mechanisms must be employed to insure that the legacy devices know when a device that is compliant with a newer version of the standard is using a wireless channel to avoid a collision.

Currently, most SISO WLANs are IEEE 802.11 compliant. A current communications system provides a range extension on a SISO system by taking an 802.11a/802.11g signal and cutting the symbol rate. Specifically, the current communications system achieves range extension by dividing a symbol clock by 24, i.e., the inverse of Super-G, which doubles the clock frequency. When the symbol clock is divided, the maximum symbol duration is 96 μsec. and the corresponding rate is 250 kbps. For example, the current communications system takes an 802.11a/802.11g signal that is 16.5 MHz, divides the symbol clock by 24 and cuts the signal to 687.5 kHz. When the bandwidth for a signal is reduced, the integrated thermal noise density of the receiver is also reduced. Therefore, when the bandwidth is reduced by a factor of 24, the thermal noise floor is decreased by 10* log 10(24). This results in a 16 DB "gain" in the sensitivity of the receiver which is equivalent to at least 3 times improvement in the range of a typical wireless system. The cost of this implementation, however, is that the data rate is also decreased by a factor of 24. Furthermore, since legacy systems in the same cell as the current communications system may not detect this very narrow bandwidth, the current communications system does not interoperate with legacy 802.11a/802.11g systems in the same cell. Specifically, a legacy 802.11a/802.11g device may not detect overlapping Base Service Set (BSS) transmissions from the current system and as such the legacy 802.11a/802.11g system will not set its Clear Channel Assessment (CCA) bits appropriately. Therefore, in dense deployments, such as apartment buildings, network chaos is likely to occur when an active BSS in the current communications system overlaps with an active legacy BSS transmission.

SUMMARY OF THE INVENTION

According to one aspect of the invention, there is provided a network device implementing an orthogonal frequency division multiplexing scheme and providing an improved range extension. The network device includes receiving means for receiving data and a symbol mapper for generating a symbol for each of a plurality of subcarriers. The network device also includes a spreading module for spreading out the symbol on each of the plurality of subcarriers by using a direct sequence spread spectrum. The symbol on each of the plurality of subcarriers is spread by multiplying the symbol by predefined length sequences. The network device further includes transmitting means for transmitting the data to a receiver.

According to another aspect of the invention, there is provided a network device for receiving symbols on a plurality of subcarriers and proving improved range extension. The device includes receiving means for receiving the plurality of subcarriers. The device further includes a de-spreader module for de-spreading the symbols on each of the plurality of subcarriers. The de-spreader module includes a correlator receiver for obtaining maximum detection. The correlator produces an output sequence of a same length as an input sequence and the de-spreader module uses a point of maximum correlation on the output sequence to obtain a recovered symbol.

According to another aspect of the invention, there is provided a method implementing an orthogonal frequency division multiplexing scheme for transmitting data to a receiver and providing improved range extension. The method includes the steps of receiving data for processing and generating a symbol for each of a plurality of subcarriers. The method also includes the steps of spreading out the symbol on each of the plurality of subcarriers by using a direct sequence spread spectrum, wherein the symbol on each of the plurality of subcarriers is spread by multiplying the symbol by predefined length sequences; and transmitting the data to a receiver.

According to another aspect of the invention, there is provided a method for receiving symbols on a plurality of subcarriers and providing improved range extension. The method includes the steps of receiving the plurality of subcarriers and de-spreading the symbols on each of the plurality of subcarriers. The method also includes the steps of producing an output sequence of a same length as an input sequence and using a point of maximum correlation on the output sequence to obtain a recovered symbol.

According to another aspect of the invention, there is provided a system for implementing an orthogonal frequency division multiplexing scheme and providing an improved range extension. The system includes a transmitter for transmitting data to a receiver. The transmitter includes a symbol mapper for generating a symbol for each of a plurality of subcarriers and a spreading module for spreading out the symbol on each of the plurality of subcarriers by using a direct sequence spread spectrum. The symbol on each of the plurality of subcarriers is spread by multiplying the symbol by predefined length sequences. The receiver includes a de-spreader module for de-spreading the symbols on each of the plurality of subcarriers. The de-spreader module includes a simply correlator receiver for obtaining maximum detection. The correlator produces an output sequence of a same length as an input sequence and the de-spreader module uses a point of maximum correlation on the output sequence to obtain a recovered symbol.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 5 illustrates a spreading module of a transmitter that receives, for example, a sub-symbol and outputs L-chips of a set, and a frame that includes, for example, a legacy symbol, L-copies of short training symbols and a proprietary signal according to an embodiment of the present invention.

DETAILED DESCRIPTION OF THE INVENTION

Reference will now be made to the preferred embodiments of the present invention, examples of which are illustrated in the accompanying drawings.

Figure 1:
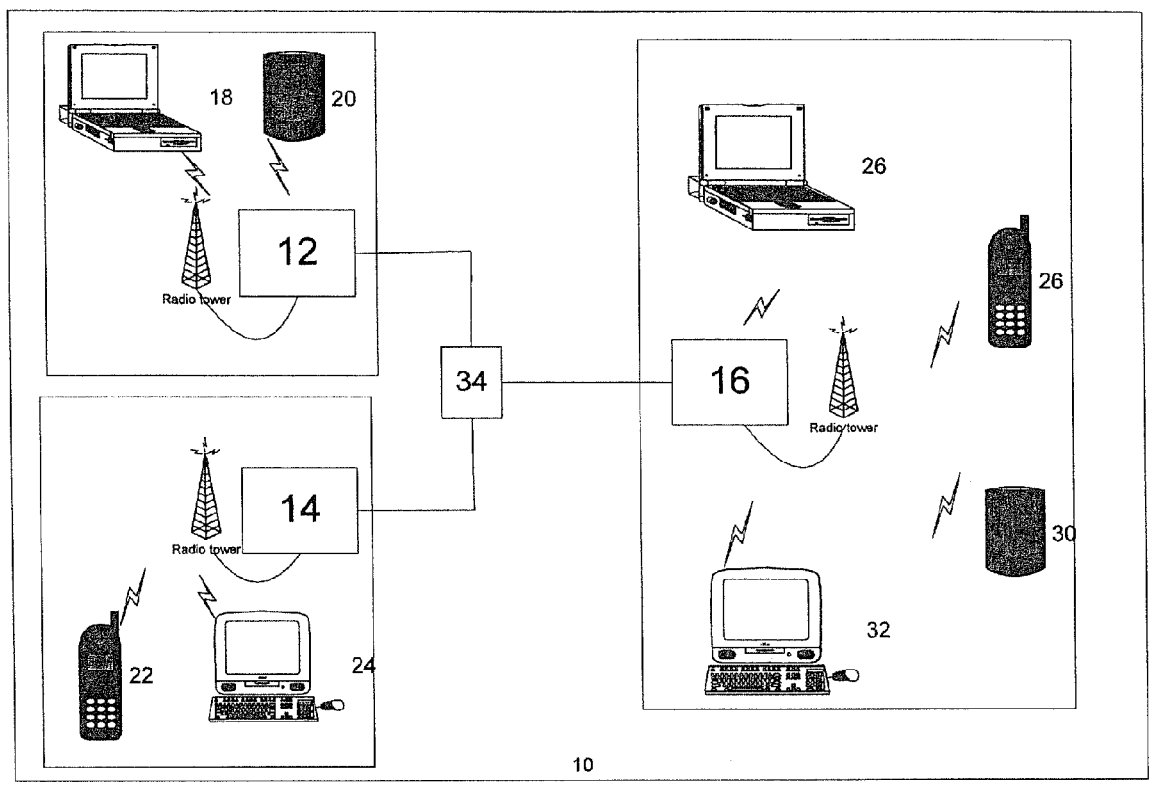
FIG. 1 illustrates a schematic block diagram illustrating a communication system.

FIG. 1 is a schematic block diagram illustrating a communication system 10 that includes a plurality of base stations and/or access points 12-16, a plurality of wireless communication devices 18-32 and a network hardware component 34. Wireless communication devices 18-32 may be laptop computers 18 and 26, personal digital assistant hosts 20 and 30, personal computer 24 and 32 and/or cellular telephone 22 and 28. Base stations or access points 12-16 are operably coupled to network hardware 34 via local area network connections 36, 38 and 40. Network hardware 34, for example a router, a switch, a bridge, a modem, or a system controller, provides a wide area network connection for communication system 10. Each of base stations or access points 12-16 has an associated antenna or antenna array to communicate with the wireless communication devices in its area. Typically, the wireless communication devices register with a particular base station or access point 12-14 to receive services from communication system 10. Each wireless communication device includes a built-in radio or is coupled to an associated radio. The radio includes at least one radio frequency (RF) transmitter and at least one RF receiver.

As is known to those skilled in the art, devices implementing both the 802.11a and 802.11g standards use an OFDM encoding scheme for transmitting large amounts of digital data over a radio wave. OFDM works by spreading a single data stream over a band of sub-carriers, each of which is transmitted in parallel. Specifically, the 802.11a/802.11g standards specify an OFDM physical layer (PHY) that splits an information signal across 52 separate sub-carriers to provide transmission of data at a rate of 6, 9, 12, 18, 24, 36, 48, or 54 Mbps. Four of the sub-carriers are pilot sub-carriers that the system uses as a reference to disregard frequency or phase shifts of the signal during transmission. The remaining 48 sub-carriers provide separate wireless pathways for sending the information in a parallel fashion. The 52 sub-carriers are modulated using binary or quadrature phase shift keying (BPSK/QPSK), 16 Quadrature Amplitude Modulation (QAM), or 64 QAM.

The present invention uses the OFDM encoding scheme and distributes data over sub-carriers that are spaced apart at precise frequencies. This spacing provides the "orthogonality" which prevents demodulators from seeing frequencies other than their own. The benefits of OFDM are high spectral efficiency, resiliency to RF interference, and lower multi-path distortion. The present invention reuses most of the data path and implements a more reliable lower rate by applying a Direct Sequence Spread Spectrum (DSSS) to each sub-carrier's stream of QAM sub-symbols. The assumption in OFDM is that each sub-carrier is a flat fading channel. Thus, the invention uses a simple matched filter receiver per sub-carrier at the receiver with insignificant loss.

Figure 2:
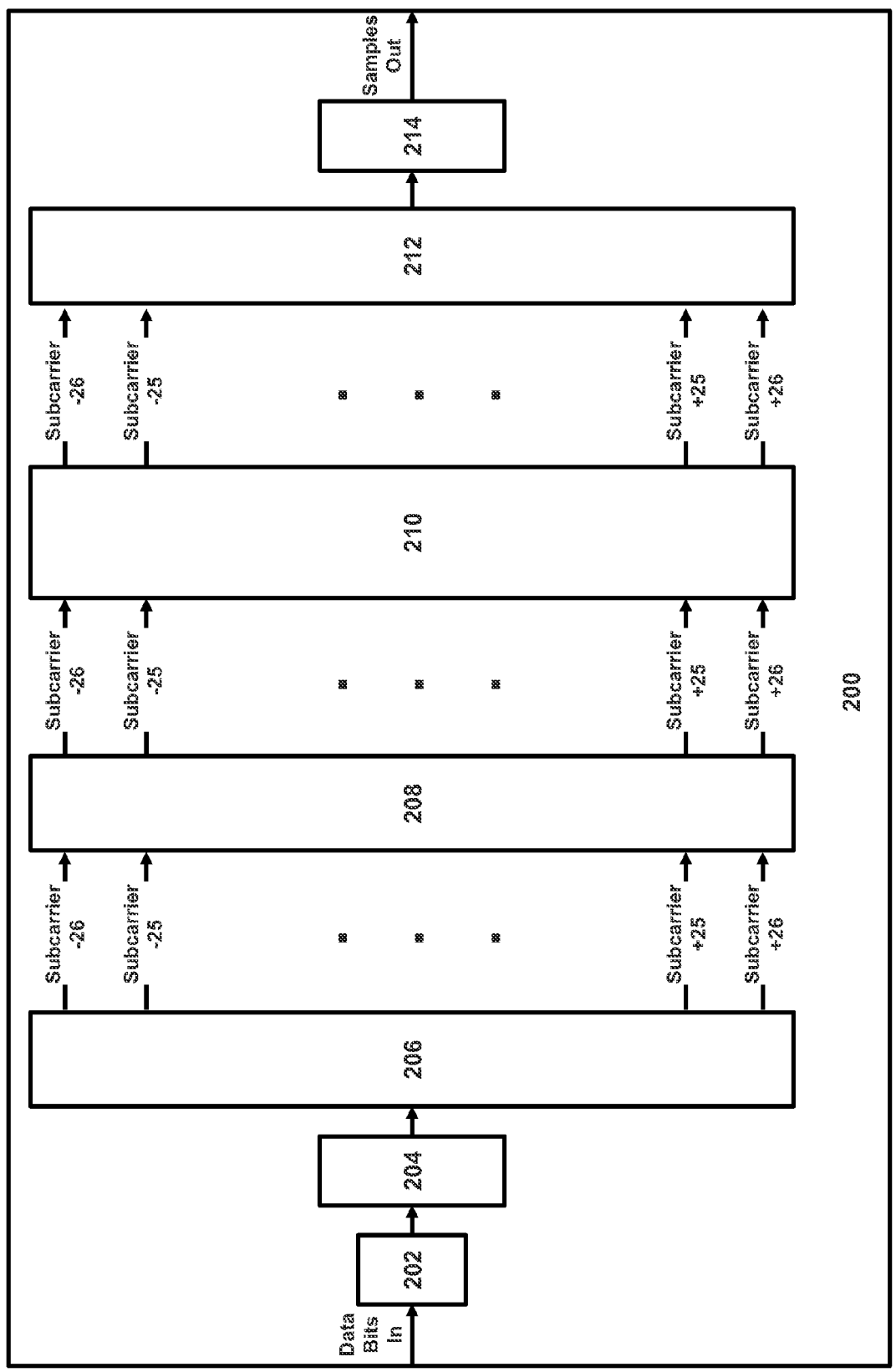
FIG. 2 illustrates a block diagram of a long-range transmitter used in the present invention.

FIG. 2 illustrates a block diagram of a long-range transmitter 200 used in the present invention. RF transmitter 200 includes a scrambler 202, a convolutional encoder and puncture module 204, a QAM symbol mapper 206, a spreading module 208, and Inverse Fast Fourier Transfer (IFFT) 210, a parallel to serial converter 212 and a cyclic prefix insertion module 214. All the bits in the data portion are scrambled by scrambler 202. Scrambling is used to randomize the data, which may contain long strings of binary data. The data field is then coded by convolutional encoder 204 with a coding rate of $r=\frac{1}{2}$. Symbol mapper 206 modulates the OFDM sub-carriers by using QAM modulation. Specifically, the data enters symbol mapper 206 which generates a QAM symbol for each OFDM sub-carrier.

The invention provides spreading gain improvement, wherein after the symbol are mapped to sub-carriers, spreading module 208 spreads out the symbol sequence on each of the parallel flat fading channels by using a direct sequence spread spectrum. Therefore, the symbols on each of the sub-carriers are spread out to the full sub-carrier width. According to the inventive system, each QAM sub-symbol is expanded into a set of L chips. Frank sequences may be used as the spreading code. According to one embodiment, the symbols are spread using a Constant Amplitude Zero Auto Correlation (CAZAC) sequence, wherein when a correlation is performed with itself, a non-zero component is present at only one point in time. The present invention spreads the symbols using length (L) CAZAC sequences, where L equals to 4, 16 or 64 sequences. As such, one symbol from symbol mapper 206 is multiplied by L sequences and when L=4, four symbols are produced by the spreading module 208, when L=16, 16 symbols are produced by the spreading module 208 and when L=64, 64 symbols are produced by spreading module 208.

A spreading sequence when L=16 and (i) is square root of −1 is presented by the equation:

$$C_{spread,16}=[1+i,-1-i,-1-i,-1-i,1+i,1-i,1+i,-1+i,1+i,\\1+i,-1-i,1+i,1+i,1+i,-1+i,1+i,1-i]$$

When spreading module 208 applies the above spreading sequence, for each sub-carrier, spreading module 208 outputs a Length 16 sequence. IFFT 210 converts the sub-carriers from the frequency domain to the time domain. Parallel to serial converter 212 converts parallel time domain signals to a plurality of serial time signals. Cyclic prefix insertion module 214 introduces the cyclic prefix as a guard interval to each sub-channel. Therefore, orthogonality can be maintained while bandwidth efficiency is maintained. Transmitter 200 then transmits the OFDM symbols to a receiver.

Figure 3:
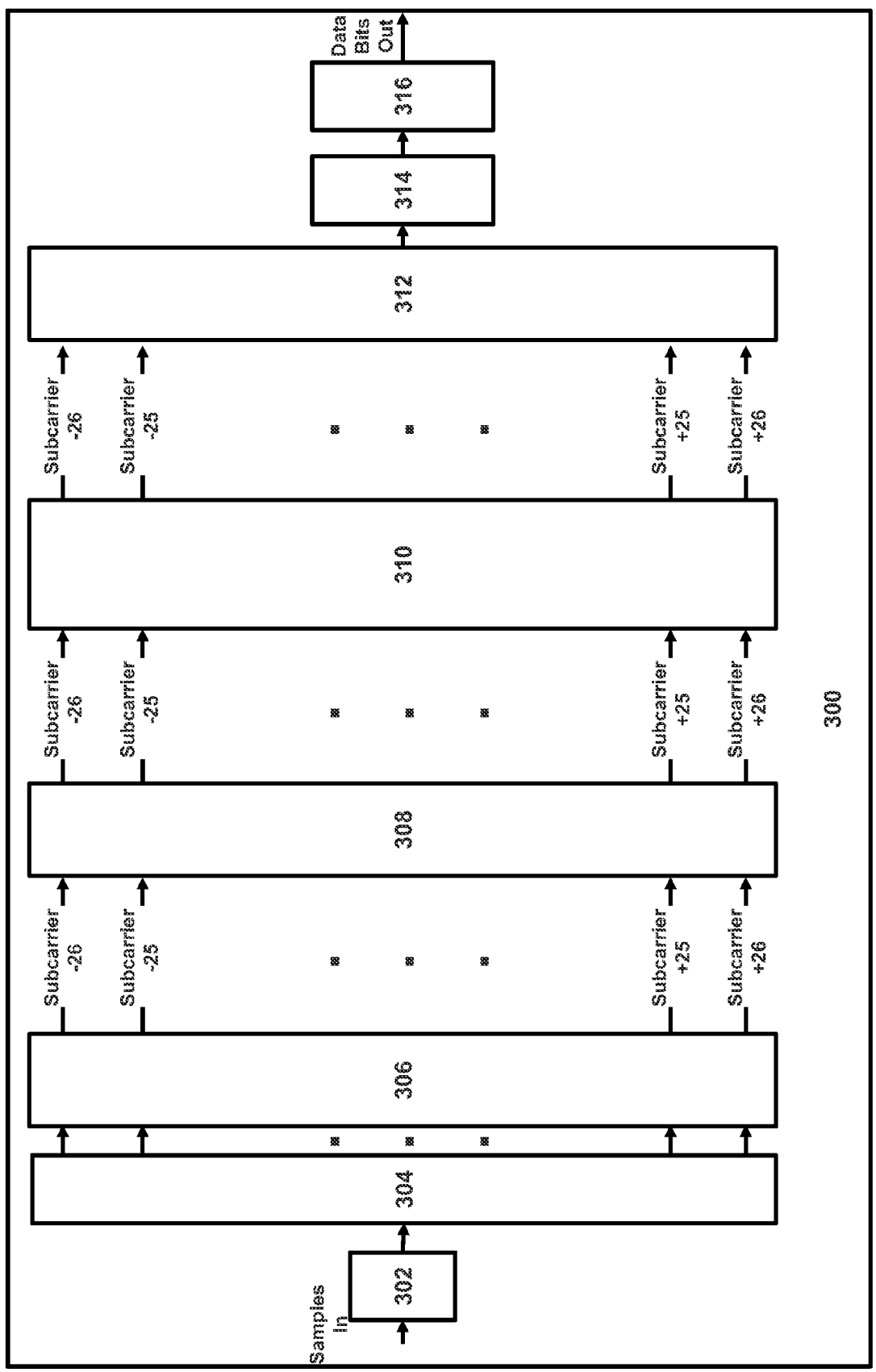
FIG. 3 illustrates a block diagram of a long-range receiver implemented in the inventive system.

FIG. 3 illustrates a block diagram of a long-range receiver 300 used in the present invention. Receiver 300 receives the OFDM sub-carriers and instead of making a decision for each symbol, receiver 300 takes a whole screen of symbols on each of the sub-carriers and runs a correlator on each of the received sub-carriers. Receiver 300 includes cyclic prefix removal module 302, Fast Fourier Transfer (FFT) 304, frequency domain module 306, de-spreader module 308, QAM symbol demapper 310, parallel to serial converter 312, Viterbi decoder 314, and descrambler 316. Cyclic prefix removal module 302 removes the cyclic prefix inserted by transmitter 200. Thereafter, FFT 304 converts the serial time domain signals into frequency signals. Frequency domain module 306 applies a weighting factor on each frequency domain signal. The correlator in de-spreader module 308 despreads the signals that were spread at the transmitter. The invention allows the use of a simple correlator receiver for obtaining maximum detection. The correlator is a matched filter and the path of the filter are the spreading sequence time reversed and complex conjugated. As such, the first element of the sequence becomes the last and the last become the first. In the case of a spreading sequence where L=16, the correlator produces 16 outputs that correspond to the 16 inputs. Thereafter, de-spreader module 308 takes exactly the point of maximum correlation which is exactly the recovered symbol. Processing gain in the inventive system of approximately 10*log 10(L) is achieved by applying the matched filter per subcarrier since the channel decoder processing follows the matched filtering.

Symbol demapper 310 then generates the coded bits from each of the sub-carriers in the OFDM sequence. Parallel to serial converter 312 converts the digital time domain signals into a plurality of serial time domain signals. Viterbi Decoder 314 decodes input symbols to produce binary output symbols. Bits in the data portion are descrambled by descrambler 318.

The present invention thus allows for the use of the same bandwidth that is used in legacy systems employing the 802.11a and 802.11g standards. It may also be possible to get a diversity benefit by mappng each of the L chips in a block to a different sub-carrier. Since the equalization is performed before de-spreading, each received chip may be pulled from a different sub-carrier. Although the noise variance on each chip will be different, the present invention provides a frequency diversity benefit.

Furthermore, the data path computational complexity when L=4 requires no more than one negation operation per transmitted chip beyond processing implemented in 802.11a/802.11g and no more than one negation operation and one addition per received chip beyond processing implemented in 802.11a/802.11g. When L=16 the data path computational complexity requires no more than two negation operations and two additions per transmitted chip beyond processing implemented in 802.11a/802.11g and no more than two negation operations and three additions per received chip beyond processing implemented in 802.11a/802.11g. Thus, no new multipliers are required.

Figure 4:
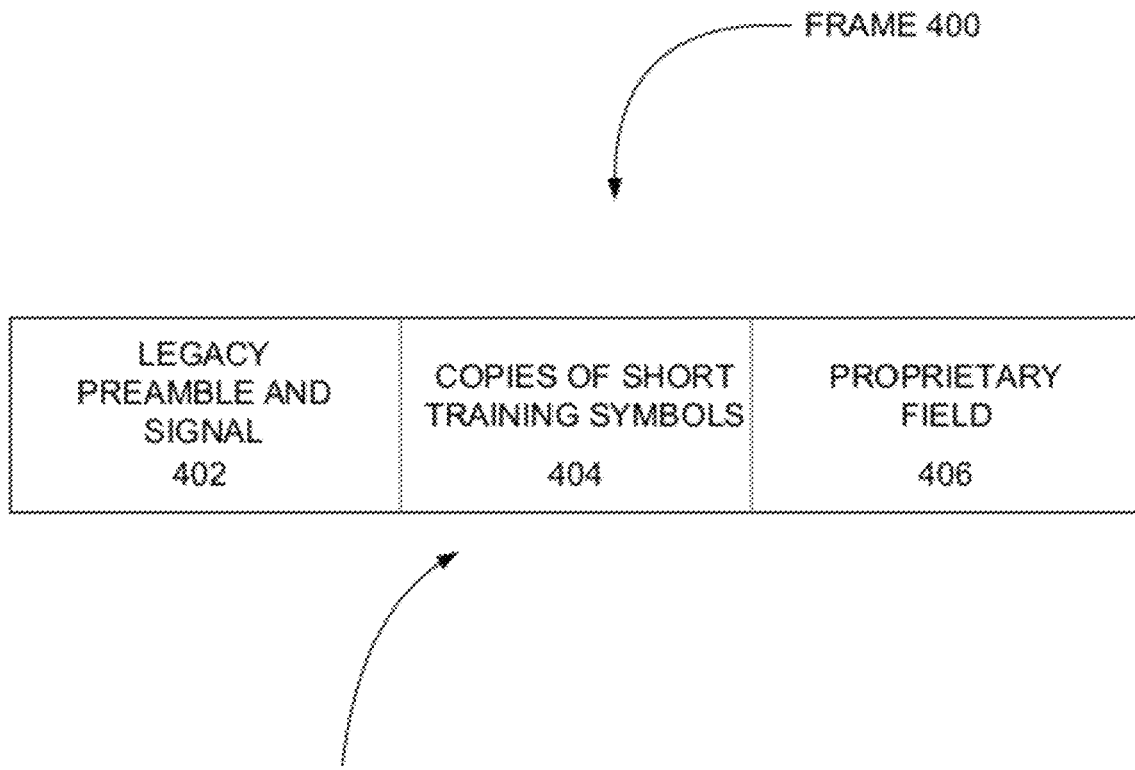
FIG. 4 illustrates a long-range frame 400 utilized in the present invention.

As is known to those skilled in the art, each legacy 802.11a/802.11g system needs to decode a valid SIGNAL field to determine the length of a frame to set its CCA bit. The legacy SIGNAL field specifies the rate and a length value in bytes which matches the length of the actual frame. If additional information is added to the frame, at the end of the frame when the legacy receiver attempts to decode the FCS, it detects an error and discards the frame. FIG. 4 illustrates a long-range frame 400 utilized in the present invention. According to the present invention, after the legacy preamble and SIGNAL frame 402, L copies of short training symbols 404 are appended and followed by a proprietary field 406. The additional copies of short training symbols 404 allow long-range receiver 300 to perform carrier detection in extremely low SNR. Proprietary field 406 includes DSSS-encoded OFDM for long training symbols, SIGNAL and data. The proprietary long training symbols, SIGNAL field and data symbols are transmitted using the inventive DSSS encoding. As such, frame 400 includes information for instructing legacy 802.11a/802.11g receivers to ignore field 406. According to the invention, a legacy system uses the header in preamble 402 to set its CCA bi,t provided that the actual frame duration does not exceed 5.48 msec and the transmissions from the inventive system are above a sensitivity threshold. The channel utilization in the current invention is exactly the same as the channel utilization in a legacy 802.11a/802.11g system. Furthermore, there is no need to clock DACs, ADC and logic at lower rates. Additionally, there is no requirement for special BSS as the long-range rates are just new rates that can be used in the same BSS with legacy device. Therefore, compatibility is ensured by prepending the legacy preamble and SIGNAL fields.

It should be appreciated by one skilled in art, that the present invention may be utilized in any device that implements the OFDM encoding scheme. The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:
1. A network device comprising:
a symbol mapper configured to generate, from incoming data, a symbol for each of a plurality of subcarriers;
a spreading module configured to spread out the symbol on each of the plurality of subcarriers by using a direct sequence spread spectrum technique, wherein the sym- bol on each of the plurality of subcarriers is spread by multiplying the symbol by predefined length sequences into a set of chips; and wherein the network device is configured to append, to outgoing data to be transmitted to a receiver, a number of copies of short training symbols, the number of copies of the short training symbols equaling the number of chips in the set, and the copies of the short training symbols being transmitted between a legacy signal and a proprietary signal.

2. The network device of claim 1, further comprising:
a scrambler configured to scramble bits in the incoming data;
a convolution encoder and puncture module configured to code the incoming data having scrambled bits with a coding rate of half, prior to transmitting the incoming data to the symbol mapper;
an Inverse Fast Fourier Transfer configured to convert the plurality of subcarriers from the spreading module from a frequency domain to a time domain to generate a plurality of parallel time domain signals;
a parallel to serial converter configured to convert the plurality of parallel time domain signals to a plurality of serial time domain signals; and
a cyclic prefix insertion module configured to introduce a cyclic prefix as a guard interval to each of the plurality of serial time domain signals.

3. The network device of claim 1, the symbol mapper generates a quadrature phase shift symbol for each of the plurality of subcarriers.

4. The network device of claim 3, the symbol on each of the plurality of subcarriers is spread to the full width of the sub carrier.

5. The network device of claim 1, the symbol on each of the plurality of subcarriers is spread using a Constant Amplitude Zero Auto Correlation (CAZAC) sequence, wherein when a correlation is performed with the CAZAC sequence itself, a non zero component is present at only one point in time.

6. A method comprising:
receiving incoming data for processing;
generating, from the incoming data, a symbol for each of a plurality of subcarriers;
spreading out the symbol on each of the plurality of subcarriers by using a direct sequence spread spectrum technique, wherein the symbol on each of the plurality of subcarriers is spread by multiplying the symbol by predefined length sequences into a set of chips;
appending, to outgoing data to be transmitted to a receiver, a number of copies of short training symbols, the number of copies of the short training symbols equaling the number of chips in the set, and the copies of the short training symbols being transmitted between a legacy signal and a proprietary signal; and
transmitting the outgoing data to a receiver.

7. The method of claim 6 comprising spreading the symbol on each of the plurality of subcarriers using length Constant Amplitude Zero Auto Correlation sequences, wherein the length is one of four, sixteen or sixty-four.

8. The method of claim 6 comprising generating a symbol for each of a plurality of orthogonal frequency division multiplexing (OFDM) subcarriers, the symbol comprising a stream of quadrature amplitude modulation (QAM) sub-symbols.

9. The method of claim 6, the plurality of subcarriers is a plurality of OFDM subcarriers, and each of the chips in the set is mapped to a different OFDM subcarrier of the plurality of OFDM subcarriers.

10. The method of claim 6, further comprising:
scrambling bits in the incoming data;
coding the incoming data having scrambled bits with a coding rate of half, prior to the step of generating;
converting the plurality of subcarriers from a frequency domain to a time domain to generate a plurality of parallel time domain signals, after the step of spreading;
converting the plurality of parallel time domain signals to a plurality of serial time domain signals; and
introducing a cyclic prefix as a guard interval to each of the plurality of serial time domain signals, prior to the step of transmitting.

11. The method of claim 6, the generating further comprises generating a quadrature phase shift symbol for each of the plurality of subcarriers.

12. The method of claim 6, the spreading further comprises spreading the symbol on each of the plurality of subcarriers to the full width of the subcarrier.

13. The method of claim 6, the spreading further comprises spreading the symbol on each of the plurality of subcarriers using a Constant Amplitude Zero Auto Correlation (CAZAC) sequence, wherein when a correlation is performed with the CAZAC sequence itself, a non zero component is present at only one point in time.

14. The method of claim 6, the spreading further comprises spreading the symbol on each of the plurality of sub carrier using length Constant Amplitude Zero Auto Correlation sequences, wherein the length is one of four, sixteen or sixty-four.

15. A network device comprising:
means for receiving a signal from a transmitter, the signal including a legacy signal, a proprietary signal, and a number of copies of short training symbols, wherein:
at least the proprietary signal includes a set of chips on each of a plurality of subcarriers, wherein each of the set of chips comprises a particular number of chips,
the number of copies of the short training symbols equals the particular number of chips, and
the copies of the short training symbols are received between the legacy signal and the proprietary signal; and
a de-spreader module configured to de-spread a symbol included in the set of chips on each of the plurality of subcarriers, wherein the de-spreader module includes a correlator receiver for obtaining maximum detection, wherein the correlator produces an output sequence of a same length as an input sequence and the de-spreader module uses a point of maximum correlation on the output sequence to obtain a recovered symbol.

16. The network device of claim 15, the correlator is a filter and a path of the filter includes a spreading sequence time reversed and complex conjugated.

17. The network device of claim 15, comprising:
a cyclic prefix removal module configured to remove a cyclic prefix from each of the plurality of subcarriers;
a Fast Fourier Transfer configured to convert serial time domain signals on each of the plurality of subcarriers to frequency domain signals; and
a frequency domain module configured to apply a weighting factor on each frequency domain signal.

18. The network device of claim 15, the correlator is a matched filter.

19. The network device of claim 15, the plurality of subcarriers is a plurality of orthogonal frequency division multiplexing (OFDM) subcarriers, and each of the chips in the set is mapped to a different OFDM subcarrier of the plurality of OFDM subcarriers.

20. The network device of claim 15, at least part of the legacy signal specifies a rate and a length value in bytes which matches the length of the frame.

21. A method comprising:

receiving a signal from a transmitter, the signal including a legacy signal, a proprietary signal, and a number of copies of short training symbols, wherein:

at least the proprietary signal includes a set of chips on each of a plurality of subcarriers, wherein each of the set of chips comprises a particular number of chips, the number of copies of the short training symbols equals the particular number of chips, and the copies of the short training symbols are received between the legacy signal and the proprietary signal; and de-spreading a symbol included in the set of chips on each of the plurality of sub carriers, the de-spreading including:

producing an output sequence of a same length as an input sequence, and using a point of maximum correlation on the output sequence to obtain a recovered symbol.

22. The method of claim 21 further comprising:

removing a cyclic prefix from each of the plurality of sub carriers;

converting serial time domain signals on each of the plurality of subcarriers to frequency domain signals; and applying a weighting factor on each frequency domain signal; generating coded bits from each of the plurality of subcarriers.

* * * * *